US008334231B2

(12) United States Patent
Mao et al.

(10) Patent No.: US 8,334,231 B2
(45) Date of Patent: Dec. 18, 2012

(54) HYDROCRACKING CATALYST, THE PREPARATION PROCESS AND USE OF THE SAME

(75) Inventors: Yichao Mao, Beijing (CN); Hong Nie, Beijing (CN); Jianwei Dong, Beijing (CN); Zhenlin Xiong, Beijing (CN); Zhihai Hu, Beijing (CN); Yahua Shi, Beijing (CN); Dadong Li, Beijing (CN)

(73) Assignees: China Petroleum and Chemical Corporation, Beijing (CN); Research Institute of Petroleum Processing, SINOPEC, Beijing (CN)

( * ) Notice: Subject to any disclaimer, the term of this patent is extended or adjusted under 35 U.S.C. 154(b) by 767 days.

(21) Appl. No.: 11/919,619

(22) PCT Filed: Apr. 26, 2006

(86) PCT No.: PCT/CN2006/000799
§ 371 (c)(1),
(2), (4) Date: Sep. 17, 2009

(87) PCT Pub. No.: WO2006/116914
PCT Pub. Date: Nov. 9, 2006

(65) Prior Publication Data
US 2010/0032341 A1  Feb. 11, 2010

(30) Foreign Application Priority Data

Apr. 29, 2005  (CN) .......................... 2005 1 0068174

(51) Int. Cl.
*B01J 29/072* (2006.01)
*B01J 31/04* (2006.01)
*B01J 31/18* (2006.01)
*C10G 47/20* (2006.01)

(52) U.S. Cl. .......... 502/66; 502/113; 502/167; 502/172; 208/111.3; 208/111.35

(58) Field of Classification Search .................. 502/77, 502/113, 167, 172, 66; 208/111.3, 111.35
See application file for complete search history.

(56) References Cited

U.S. PATENT DOCUMENTS

| 4,503,023 A | 3/1985 | Breck et al. |
| 4,530,911 A | 7/1985 | Ryan et al. |
| 4,708,786 A * | 11/1987 | Occelli ....................... 208/120.1 |
| 2003/0104926 A1 | 6/2003 | Eijsbouts et al. |
| 2006/0054536 A1 | 3/2006 | Fujikawa et al. |

FOREIGN PATENT DOCUMENTS

| CN | 1037168 | 11/1989 |
| CN | 1054150 | 7/2000 |
| CN | 1356380 | 7/2002 |
| GB | 2114594 | 8/1983 |
| JP | 53101003 | 9/1978 |
| WO | 2004/054712 | 7/2004 |

OTHER PUBLICATIONS

Supplementary European Search Report, Aug. 19, 2009, from European Patent Application No. 06722404.
Linch, 2002, "Development of structural characterization tools for catalysts", Oil and Gas Science Technology, 57(3)281-305.
International Search Report, Aug. 10, 2006, from International Patent Application No. PCT/CN2006/000799, filed Apr. 26, 2006.
Emeis, 1993, "Determination of Integrated Molar Extinction Coefficients for Infrared Absorption Bands of Pyridine Adsorbed on Solid Acid Catalysts", 141:347-354.

* cited by examiner

Primary Examiner — Walter D Griffin
Assistant Examiner — Renee E Robinson
(74) Attorney, Agent, or Firm — Kenyon & Kenyon LLP

(57) ABSTRACT

The present invention provides a hydrocracking catalyst comprising a moulded composite support of a zeolite molecular sieve with alumina, at least one of VIII Group metal components, at least one of VIB Group metal components and an organic additive; said organic additive is one or more compounds selected from the group consisting of oxygen-containing or nitrogen-containing organic compounds; the content of said zeolite molecular sieve is 3~60 wt %, the content of said alumina is 10~80 wt %, and the content of said organic additive is 0.1~40 wt % based on the weight of said catalyst; the content of said VIII Group metal component is 1~15 wt % and the content of said VIB Group metal component is 5~40 wt % as calculated on oxide and based on the weight of said catalyst. The present invention relates also to a preparation method of said hydrocracking catalyst and use of the catalyst in the hydrocracking process of hydrocarbon oil. In comparison with the method in existing arts, the hydrocracking catalyst provided according to the present invention has the aromatic-hydrogenation conversion activity increased obviously.

16 Claims, 1 Drawing Sheet

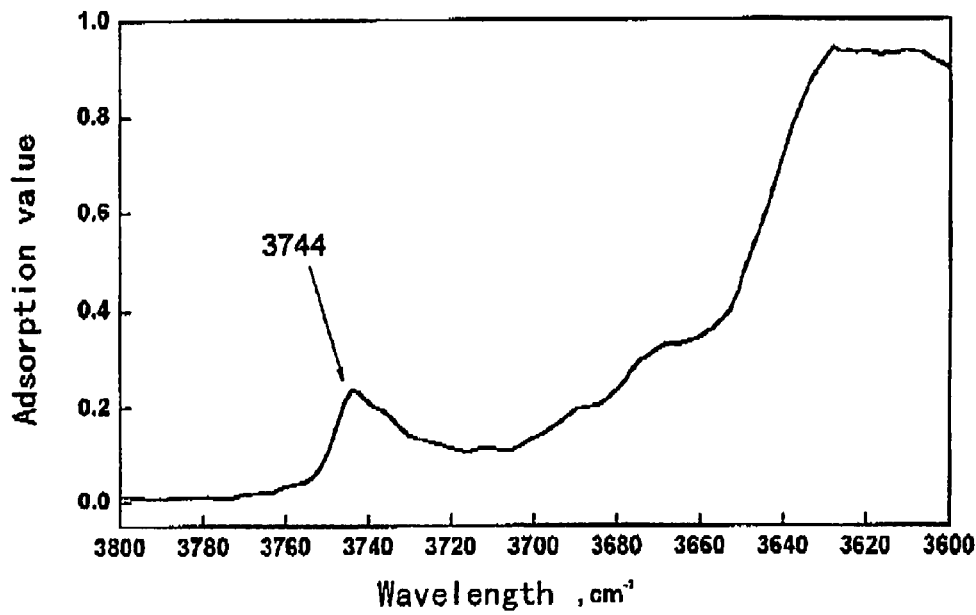
FIG. 1  An infrared spectrogram of hydroxy group of CZ-2 molecular sieve
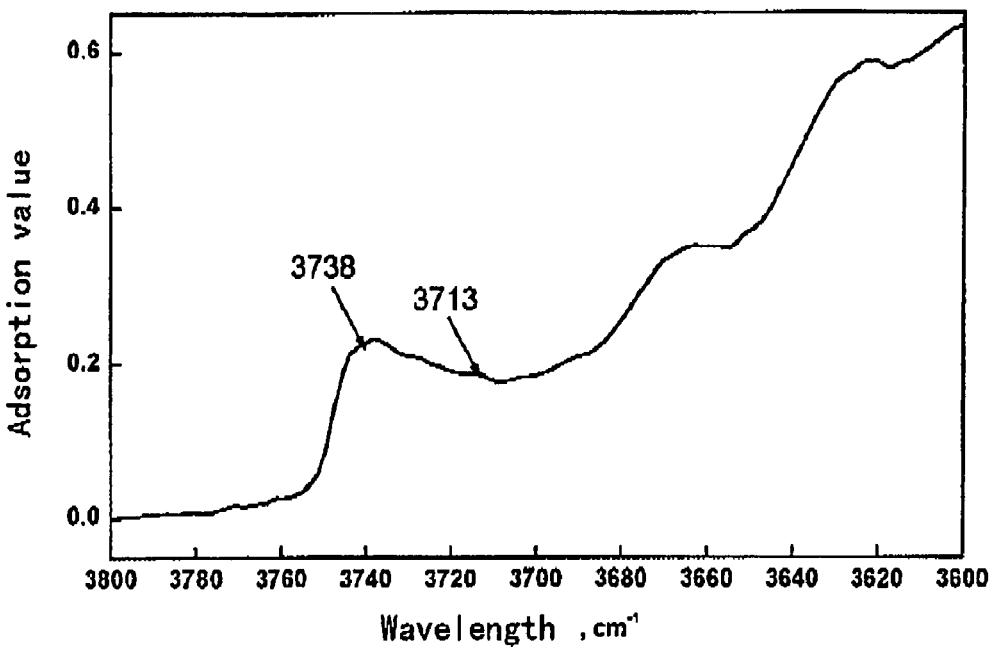
FIG. 2  An infrared spectrogram of hydroxy group of CZ-3 molecular sieve

HYDROCRACKING CATALYST, THE PREPARATION PROCESS AND USE OF THE SAME

TECHNICAL FIELD

The present invention relates to a hydrocracking catalyst, the preparation method and use of the same.

TECHNICAL BACKGROUND

The hydrocracking catalyst is a bifunctional catalyst having both catalytic cracking activity and hydrogenation activity, i.e. containing both an acidic component and an active component of hydrogenation. The cracking component is generally selected from an acidic silica-alumina including: silica-alumina, zeolite molecular sieve or the mixtures thereof, and the active component of hydrogenation is generally selected from metals of VIB group and VIII group in the Periodic Table of Elements, or oxides and/or sulfides of the metals. The acidic component and the active component of hydrogenation of the catalyst are needed to be adaptively adjusted to fulfill various requirements of hydrocracking products.

CN1054150C discloses a hydro-conversion catalyst of diesel oil. The catalyst comprises a support composed of alumina, an amorphous silica-alumina and a molecular sieve, and hydrogenation-active metals supported thereon. In the catalyst, the content of $WO_3$ is 10~30 wt %, the content of NiO is 2~15 wt %, the content of a molecular sieve is 5~45 wt %, the content of alumina is 30~70 wt % and the content of an amorphous silica-alumina is 5~25 wt %. Said molecular sieve is a Y-type molecular sieve having a total of infrared acidity of 0.5~1 mmole/g and a unit cell size of 2.436~2.444 nm. Said alumina is a micropore alumina with a pore volume of 0.8~1.1 ml/g and a surface area of 230~400 $m^2/g$.

CN1184843A discloses a hydro-conversion catalyst of diesel oil. The catalyst has a composition of 40~80 wt % of an alumina, 0~20 wt % of an amorphous silica-alumina and 5~30 wt % of a molecular sieve which is a Y-type of molecular sieve with a pore volume of 0.40~0.52 ml/g, a specific surface area of 750~900 $m^2/g$, a unit cell sizes of 2.420~2.500 and a silica-alumina ratio of 7~15, and 10~30 wt % of VIB Group metal and 2~15 wt % of VIII Group metal oxide.

U.S. Pat. No. 5,030,780 discloses a saturation process of aromatic compounds which uses a catalyst containing hydrogenation metals supported on a support. Said catalyst support contains a zeolite and a porous heat-resistant inorganic oxide, especially a silica-aluminum heat-resistant inorganic oxide dispersed in an alumina matrix. Said zeolite includes various crystalo-silica-alumina zeolites known in nature or synthesized artificially, such as faujasite, mordenite, erionite zeolite, Y-zeolite, X-zeolite, L-zeolite, Ω-zeolite, ZSM-4 zeolite, Beta-zeolite and the like.

CN1055961C discloses a hydrocracking catalyst particularly suitable for producing middle fraction oil, containing an amorphous silica-alumina component and a micropore alumina adhesive, in which the content of amorphous silica-alumina is 30~60 wt %, and at least one of Group VIB elements and at least one of Group VIII elements, the total content of the metal oxides for hydrogenation is 20-35 wt %, and the balance is micropore alumina adhesive, characterized in that the catalyst has a specific surface area of 150~300 $m^2/g$, a pore volume of 0.25~0.50 ml/g, a distribution of 4~15 nm pores in the range of 60~90% and an infrared acidity of 0.30~0.50 mmol/g.

CN1400284A discloses a hydrotreating catalyst of diesel oil, comprising a support and molybdenum and/or tungsten and nickel and/or cobalt supported thereon, characterized in that said support is composed of alumina and zeolite with a weight-ratio of alumina to the zeolite in the range of 90:10~50:50; said alumina is a mixed alumina of a micropore alumina and a macropore alumina with a weight-ratio of 75:25~50:50, wherein the micropore alumina is an alumina of which the pore volume having a pore diameter of less than 80 Angstrom accounts for more than 95% of the total pore volume and the macropore alumina is an alumina of which the pore volume having a pore diameter of 60~600 Angstrom accounts for more than 70% of the total pore volume.

Hydrocracking catalysts provided by the prior art can meet the requirement of some hydrocracking reactions, but aromatic-saturation and ring opening activity thereof are still low.

DETAILED DESCRIPTION OF INVENTION

The object of the present invention is to provide a hydrocracking catalyst with higher aromatic-saturation activity (hereinafter referred to as the catalyst according to the present invention in some places) and a preparation method of the catalyst, so as to overcome the disadvantages of low aromatics-saturation and low ring opening activity present in existing hydrocracking catalysts. furthermore The present invention relates to use of said hydrocracking catalyst in the hydrocracking process of hydrocarbon oil.

Therefore, the present invention firstly provides a hydrocracking catalyst comprising a moulded composite support of a zeolite molecular sieve and alumina, at least one of VIII Group metal components, at least one of VIB Group metal components and an organic additive; wherein said organic additive is one or more compounds selected from the group consisting of oxygen-containing or nitrogen-containing organic compounds, and based on weight of said catalyst the content of said zeolite molecular sieve is 3~60 wt %, the content of said alumina is 10~80 wt % and the content of said organic additive is 0.1~40 wt %; and the content of said VIII Group metal component is 1~15 wt % and as calculated on oxide and based on weight of the catalyst the content of said VIB Group metal component is 5~40 wt %.

In one embodiment, said hydrocracking catalyst contains no additional components, except a moulded composite support of a zeolite molecular sieve and alumina, at least one of VIII Group metal components, at least one of VIB Group metal components and an organic additive. That is to say, the hydrocracking catalyst in one embodiment of the present invention comprises said moulded composite support of said zeolite molecular sieve and said alumina, said at least one of VIII Group metal components, said at least one of VIB Group metal components and said organic additive, wherein said organic additive is one or more compounds selected from the group consisting of oxygen-containing or nitrogen-containing organic compounds, and the content of said zeolite molecular sieve is 3~60 wt %, the content of said alumina is 10~80 wt % and the content of said organic additive is 0.1~40 wt % based on weight of said catalyst, and the content of said VIII Group metal component is 1~15 wt % and the content of said VIB Group metal component is 5~40 wt %, as calculated on oxide and based on weight of said catalyst.

Compared with existing arts, the hydrocracking catalyst according to the present invention substantially improves the aromatic-hydrogenation conversion activity.

For example, C-1 catalyst containing an organic additive provided by the present invention is different from the reference catalyst RC-1 merely in that said catalyst C1 contains 0.85 wt % of EDTA as an organic additive. When evaluated by using n-octane solution containing 5.61% of tetrahydronaphthalene, the aromatic-hydrogenation conversion activity of the catalyst C1 increases 5%, as compared with that of the reference catalyst RC-1.

The present invention further provides a preparation method of said hydrocracking catalyst, which comprises mixing a zeolite molecular sieve, alumina and/or a precursor of alumina, and then moulding and calcining the resultant mixture to prepare a moulded composite support; and then introducing at least one of VIII Group metal components, at least one of VIB Group metal components and an organic additive into said moulded composite support. Said organic additive is one or more compounds selected from the group consisting of oxygen-containing or nitrogen-containing organic compounds; and the amounts of said various components are selected such that the content of each component in the catalyst meets the following conditions respectively: the content of said zeolite molecular sieve is 3~60 wt %, the content of said alumina is 10~80 wt % and the content of said organic additive is 0.1~40 wt % based on the weight of said catalyst; and the content of said VIII Group metal component is 1~15 wt % and the content of said VIB Group metal component is 5~40 wt %, as calculated on oxide and based on the weight of said catalyst.

In addition, the present invention further relates to the use of said hydrocracking catalyst in the hydrocracking process of hydrocarbon oil. The process according to the present invention for hydrocracking hydrocarbon oil comprises the step of contacting a hydrocarbon oil feedstock with said hydrocracking catalyst in the presence of hydrogen under hydrocracking reaction conditions. The present invention increases the conversion efficiency of aromatic hydrogenation considerably in the hydrocracking process of hydrocarbon oil of the present invention.

For example, the hydrocracking process of the feedstock oil as provided is carried out using the catalyst C-3 according to the present invention containing an organic additive under conditions of: a reaction temperature of 350° C., a hydrogen partial pressure of 6.4 MPa, a liquid hourly space velocity 0.75 hrs$^{-1}$ and a hydrogen/oil volume ratio of 800. The process is only different from the reference process of the Comparative Example 3 in that the reference hydrocracking process uses a catalyst containing no organic additive. Comparing the two processes under the same condition, it may be concluded that the former process has the yield of <350° C. formation oil increased by 5.8 wt % and the BMCI value of >350° C. formation oil is 1.9 unit less than the Comparative Example. After the reaction temperature is increased to 380° C., the hydrocracking process using the catalyst containing organic additive has the yield of <350° C. formation oil increased further by 16 wt %, and the BMCI value of >350° C. formation oil decreased further by 4.8 unit.

That is to say, the present invention relates to several aspects as below:

1. A hydrocracking catalyst, comprising a moulded composite support of a zeolite molecular sieve with alumina, at least one of VIII Group metal components, at least one of VIB Group metal components and an organic additive, said organic additive is one or more compounds selected from the group consisting of oxygen-containing or nitrogen-containing organic compounds, and the content of said zeolite molecular sieve is 3~60 wt %, the content of said alumina is 10~80 wt % and the content of said organic additive is 0.1~40 wt %, based on the weight of said catalyst; and the content of said VIII Group metal component is 1~15 wt % and the content of said VIB Group metal component is 5~40 wt %, as calculated on oxide and based on the weight of said catalyst.

2. The hydrocracking catalyst according to aspect 1, characterized in that said catalyst consists of said moulded composite support of said zeolite molecular sieve with said alumina, said at least one of VIII Group metal components, said at least one of VIB Group metal components and said organic additive.

3. The hydrocracking catalyst according to aspect 1 or 2, characterized in that said oxygen-containing organic compound is one or more compounds selected from the group consisting of organic alcohols and organic acids, said nitrogen-containing organic compound is one or more compounds selected from the group consisting of organic amines, and the content of said zeolite molecular sieve is 5~60 wt %, the content of said alumina is 15~80 wt % and the content of said organic additive is 0.5~30 wt % based on the weight of said catalyst; the content of said VIII Group metal component is 2~8 wt % and the content of said VIB Group metal component is 10~35 wt % as calculated on oxide and based on the weight of said catalyst.

4. The hydrocracking catalyst according to aspect 1 or 2, characterized in that said zeolite molecular sieve is one or more zeolite molecular sieves selected from the group consisting of a zeolite molecular sieve having faujasite structure, a zeolite molecular sieve having Beta zeolite structure and a zeolite molecular sieve having mordenite structure.

5. The hydrocracking catalyst according to aspect 4, characterized in that said zeolite molecular sieve having faujasite structure is one or more zeolite molecular sieves selected from the group consisting of a HY zeolite molecular sieve, a rare earth type of Y-zeolite REY molecular sieve, a rare earth type of HY zeolite REHY molecular sieve, a super-stable Y-zeolite USY molecular sieve, a rare earth type of super-stable Y-zeolite REUSY molecular sieve and a dealuminized Y-type of zeolite molecular sieve.

6. The hydrocracking catalyst according to aspect 1, 2, 4 or 5, characterized in that, said zeolite molecular sieve has a B-acid/L-acid ratio more than 0.9, and, when characterized by infrared spectrogram of hydroxy group, said zeolite molecular sieve has at least one characteristic peak of silicon-hydroxy group appearing in the range of 3760~3685 cm$^{-1}$.

7. The hydrocracking catalyst according to aspect 6, characterized in that the B-acid/L-acid ratio of said zeolite molecular sieve is 1~10, and, when characterized by infrared spectrogram of hydroxy group, said zeolite molecular sieve has two characteristic peaks of silicon-hydroxy group appearing in the range of 3760-3685 cm$^{-1}$.

8. A preparation process of said hydrocracking catalyst according to aspect 1, characterized in that said process comprises mixing a zeolite molecular sieve with alumina and/or a precursor of alumina, moulding and calcining the obtained mixture to prepare a moulded composite support, then introducing at least one of VIII Group metal components, at least one of VIB Group metal components and an organic additive into said moulded composite support, wherein said organic additive is one or more compounds selected from the group consisting of oxygen-containing or nitrogen-containing organic compounds, and the amounts of said various components are selected such that the content of each component in the obtained catalyst meeting the following conditions: the content of said zeolite molecular sieve is 3~60 wt %, the content of said alumina is 10~80 wt % and the content of said organic additive is 0.1~40 wt % based on the weight of said catalyst; and the content of said VIII Group metal component is 1~15 wt % and the content of said VIB Group metal component is 5~40 wt % as calculated on oxide and based on the weight of said catalyst.

9. The preparation process of said hydrocracking catalyst according to aspect 8, characterized in that said oxygen-containing organic compound is one or more compounds selected from the group consisting of organic alcohols and organic acids, said nitrogen-containing organic compound is one or more compounds selected from the group consisting of organic amines, and the amounts of said various components are selected such that the content of each component in the obtained catalyst meeting following conditions: the content of said zeolite molecular sieve is 5~60 wt %, the content of said alumina is 15~80 wt % and the content of said organic additive is 0.5~30 wt % based on the weight of said catalyst; the content of said VIII Group metal component is 2~8 wt % and the content of said VIB Group metal component is 10~35 wt % as calculated on oxide and based on the weight of said catalyst.

10. The preparation process of said hydrocracking catalyst according to aspect 8, characterized in that said zeolite molecular sieve is one or more zeolite molecular sieves selected from the group consisting of a zeolite molecular sieve having faujasite structure, a zeolite molecular sieve having Beta zeolite structure and a zeolite molecular sieve having mordenite structure.

11. The preparation process of said hydrocracking catalyst according to aspect 10, characterized in that said zeolite molecular sieve having faujasite structure is one or more compounds selected from the group consisting of a HY zeolite molecular sieve, a rare earth type of Y-zeolite REY molecular sieve, a rare earth type of HY zeolite REHY molecular sieve, a super-stable Y-zeolite USY molecular sieve, a rare earth type of super-stable Y-zeolite REUSY molecular sieve and a dealuminized Y-zeolite molecular sieve.

12. The preparation process of said hydrocracking catalyst according to aspect 8, 10 or 11, characterized in that said zeolite molecular sieve has a B-acid/L-acid ratio higher than 0.9, and, when characterized by infrared spectrogram of hydroxy group, said zeolite molecular sieve has at least one characteristic peak of silicon-hydroxy group appearing in the range of 3760~3685 $cm^{-1}$.

13. The preparation process of said hydrocracking catalyst according to aspect 11, characterized in that the B-acid/L-acid ratio of said zeolite molecular sieve is 1.0~10.0, and, when characterized by infrared spectrogram of hydroxy group, said zeolite molecular sieve has two characteristic peaks of silicon-hydroxy group appearing in the range of 3760~3685 $cm^{-1}$.

14. A hydrocracking process of hydrocarbon oil, said process comprises contacting a hydrocarbon oil feedstock with the hydrocracking catalyst in any one of preceding aspects 1~7 in the presence of hydrogen under the conditions for hydrocracking reaction.

15. The hydrocracking process of hydrocarbon oil according to aspect 14; characterized in that said conditions for hydrocracking reaction comprise: a reaction temperature of 200~650° C., a hydrogen partial pressure of 3~24 MPa, a liquid hourly space velocity of 0.1~10 $hrs^{-1}$, and a hydrogen/oil volume ratio of 100~5000.

16. The hydrocracking process of hydrocarbon oil according to aspect 15, characterized in that said conditions for hydrocracking reaction comprise: a reaction temperature of 220~510° C., a hydrogen partial pressure of 4~15 MPa, a liquid hourly space velocity of 0.2~5 $hrs^{-1}$ and a hydrogen/oil volume ratio of 200~1000.

17. The hydrocracking process of hydrocarbon oil according to aspect 14, characterized in that said hydrocarbon oil is selected from heavy mineral oil, synthetic oil or their mixed distillates.

18. The hydrocracking process of hydrocarbon oil according to aspect 17, characterized in that said heavy mineral oil is selected from straight-run gas oil, vacuum gas oil, demetallized oil, atmospheric residue, deasphalted vacuum residue, coking distillate, catalytic cracking distillate, shale oil, coal liquefied oil or tar sand oil, and said synthetic oil is Fischer-Tropsch oil.

DESCRIPTION OF FIGURES

FIG. 1 is an infrared spectrogram of hydroxy group in the zeolite molecular sieve produced in Example 2.

FIG. 2 is an infrared spectrogram of hydroxy group in the zeolite molecular sieve produced in Example 3.

THE BEST MODE OF CARRYING OUT THE INVENTION

The catalyst according to the present invention comprises a moulded composite support of a zeolite molecular sieve with alumina, a VIII Group metal component, a VIB Group metal component and an organic additive and the like as catalyst components. Each components is described in details as follows.

There is no special limitation on said zeolite molecular sieve used in the catalyst of the present invention, the zeolite molecular sieve that may be mentioned is one or more zeolite molecular sieves selected from the zeolite molecular sieves often used as cracking activity component. More particularly, the zeolite molecular sieves having macropore structure, that may be mentioned, include those having, such as, faujasite zeolite structure, Beta zeolite structure or Ω zeolite structure; the zeolite molecular sieves having mesopore structure include those having, such as, mordenite structure, ZSM-5 zeolite structure, ZSM-11 zeolite structure, ZSM-22 zeolite structure, ZSM-23 zeolite structure, ZSM-35 zeolite structure, ZSM-48 zeolite structure, ZSM-57 zeolite structure and the like, or the zeolite molecular sieves having micropore structure include those having, such as, Erionite zeolite structure or ZSM-34 zeolite structure. In a preferred embodiment, said zeolite molecular sieve is one or more zeolite molecular sieves selected from a zeolite molecular sieve having faujasite structure, a zeolite molecular sieve having beta zeolite structure and a zeolite molecular sieve having mordenite zeolite structure. More preferably, said zeolite molecular sieve having faujasite structure is Y-zeolite molecular sieve, and said Y-zeolite molecular sieve is one or more zeolite molecular sieve selected from a HY zeolite molecular sieve, a rare earth type of Y-zeolite REY molecular sieve, a rare earth type of HY zeolite REHY molecular sieve, a super-stable Y-zeolite USY molecular sieve, a rare earth type of super-stable Y-zeolite REUSY molecular sieve, a phosphor-containing Y-type of zeolite molecular sieve, a phosphor-containing Y-type of super-stable zeolite molecular sieve, a phosphor-containing HY-type of zeolite molecular sieve and a dealuminized Y-type of zeolite molecular sieves.

In a preferred embodiment, said zeolite molecular sieve has a ratio of B-acid to L-acid more than 0.9, and, when characterized by infrared spectrogram of hydroxy group, said zeolite molecular sieve has at least one characteristic peak of silicon-hydroxy group appearing in the range of 3760~3685 $cm^{-1}$. More preferably, the ratio of B-acid to L-acid is 1~10, and, when characterized by infrared spectrogram of hydroxy group, said zeolite molecular sieve has two characteristic peaks of silicon-hydroxy group appearing in the range of 3760~3685 cm$^{-1}$.

The ratio of B-acid to L-acid of said zeolite molecular sieve is measured by Bio-Rad IFS-3000 infrared spectrometer. The procedure is in that: the sample of zeolite molecular sieve is ground and pressed into about 10 mg/cm$^2$ of self-supporting tablet, then put into the in situ pool of the infrared spectrometer, and treated for purifying the surface at 350° C. under 10$^{-3}$ Pa vacuum for 2 hrs, and then cooled to room temperature. The pyridine-saturated vapor is introduced into the pool, the adsorption equilibrium is established for 15 minutes, desorption is carried out by vacuum pumping at 200° C. for 30 minutes, and the desorbed sample is cooled to room temperature to measure the adsorption and determine pyridine vibration spectrum. The scanned area is 1400 cm$^{-1}$~1700 cm$^{-1}$, and the B-acid quantity [infrared absorption value per unit area and per unit mass of the sample, expressed as: AB·(cm$^2$·g)$^{-1}$] is defined by the ratio of infrared absorption value at band 1540±5 cm$^{-1}$ to the weight and area of the sample tablet. The L acid quantity [infrared absorption value per unit area, per unit mass of sample, expressed as: AL·(cm$^2$g)$^{-1}$] is defined by the ratio of infrared absorption value at 1450±5 cm$^{-1}$ band to the weight and area of the sample tablet. The value of AB/AL is defined as the ratio of B-acid to L-acid of said zeolite molecular sieve.

The method for measuring infrared spectrogram of hydroxy group in said zeolite molecular sieve comprises grinding and pressing the sample of zeolite molecular sieve into self-supporting tablet of about 10 mg/cm$^2$, and putting the tablet into an in situ pool of the infrared spectrometer. The measurement is carried out using the Bio-Rad IFS-3000 type of infrared spectrometer. At first, the sample sheet is treated for purifying the surface at 350° C. under 10$^{-3}$ Pa of vacuum for 2 hrs, then cooled to room temperature and then the vibration spectrum of hydroxy group is measured within the scanning area of 3400 cm$^{-1}$~4000 cm$^{-1}$.

The zeolite molecular sieve used in the present invention may be commercially available, or be prepared according to conventional method. This is well known for one skilled in the art.

Said alumina may be selected from those used often as catalyst matrix, and it may be commercially available, or be prepared according to a conventional method.

In a preferred embodiment, said alumina is one or more compounds selected from the group consisting of one or more compounds selected from the group consisting of γ-alumina, η-alumina, θ-alumina, δ-alumina and χ-alumina, or γ-alumina, η-alumina, θ-alumina, δ-alumina and χ-alumina containing one or more of additive components selected from the group consisting of titanium, magnesium, boron, zirconium, thorium, niobium and rare earth.

Said moulded composite support of said zeolite molecular sieve with said alumina may be commercially available, or be prepared according to conventional moulding method. The shape of said moulded composite support that may be mentioned is, for example, microsphere, spheroid, tablet or bars and the like. Said moulding method that may be mentioned is, for example, moulding the mixture of alumina and/or its precursor with a molecular sieve, and then calcining. Said precursor of alumina may be one or more compounds selected from the group consisting of various alumina hydrates and alumina collosols, also may be one or more aforementioned aluminas (i.e., alumina hydrates and alumina collosols) containing one or more additive components selected from the group consisting of titanium, magnesium, boron, zirconium, thorium, niobium and rare earth. Said moulding may be carried out by a conventional method, such as, pelleting, tableting or extruding and the like. When extrusion-moulding is carried out to obtain the moulded composite support, a proper amount of extruding aids and/or adhesive may be added first as required, before extrusion-moulding. The kind and amount of said extruding aids and peptizing agent used are well known to one skilled in the art, so there is no need to say more herein. In addition, said calcining may be carried out by a conventional method and under the conventional conditions in the art. For example, the calcining temperature is 350~950° C., preferably 400~650° C., and the calcining time is 2-6 hrs, preferably 3~5 hrs.

There is no special limitation on the content ratio of said zeolite molecular sieve to said alumina in said moulded composite support, and any suitable value may be adopted. In a preferred embodiment, the content of said zeolite molecular sieve is 5~60 wt % and the content of said alumina is 15~80 wt % based on the weight of the catalyst obtained finally.

As metal components, the VIII Group metal component and the VIB Group metal component used in the catalyst of the present invention can be selected from corresponding types commonly used in the art. For example, said VIII Group metal component may be selected from cobalt and/or nickel etc., and said VIB Group metal component may be selected from molybdenum and/or tungsten, etc. It is easily understood that there is no special limitation on the contents of these metal components used in the catalyst of the present invention, so long as the content is enough for these components to exert catalytic activity function effectively.

In a preferred embodiment, as calculated on oxide and based on weight of the catalyst according to the present invention, the content of said VIII Group metal component is 2~8 wt % and the content of said VIB Group metal component is 10~35 wt %.

As stated previously, an organic additive may be further used as an additive component in the catalyst of the present invention. Said organic additive may be one or more compounds selected from oxygen-containing or nitrogen-containing organic compounds. For example, said oxygen-containing organic compound may be one or more compounds selected from organic alcohols and organic acids, and said nitrogen-containing organic compound may be one or more compounds selected from organic amines. Said oxygen-containing organic compounds are preferably one or more compounds selected from the group consisting of ethylene glycol, glycerol, polyethylene glycol (with a molecular weight of 200~1500), acetic acid, maleic acid, oxalic acid, aminotriacetic acid, 1,2-CDTA and citric acid, and said nitrogen-containing organic compound that may be mentioned is ethylene diamine or EDTA.

There is no special limitation on the content of said organic additive in the catalyst of the present invention, so long as the content is sufficient to exert effectively activity function. In preferred embodiment, the content of said organic additive is 0.5~30 wt % based on the weight of the catalyst of the present invention.

In an embodiment, the present invention further provides a preparation method of said hydrocracking catalyst.

The preparation method of the catalyst of the present invention is achieved in a manner by introducing these additive components to the moulded composite support in a determined amount of additive components (including at least one of VIII Group metal components, at least one of VIB Group metal components and organic additives and the like). For example, the method that may be mentioned is by formulating a mixed solution of the organic additive with at least one of VIII Group metal compounds and at least one of VIB Group metal compounds together, then contacting said moulded composite support with the mixed solution; or by formulating separate solutions of at least one of VIII Group metal compounds and at least one of VIB Group metal compounds respectively with the organic additive, then contacting said moulded composite support respectively with resultant solutions, and the like. Said contacting procedure may be finished by any method, for example, an impregnation method. There is no special limitation on said impregnation method, and a conventional method can be used.

According to the present invention, it is easily understood that said catalyst can be prepared, by adjusting and controlling the concentration and amount of the additive component solution or the amount of the moulded composite support, which meets the requirement of the content of additive components in the present invention.

In one embodiment, the organic additive and VIII Group metal component and VIB Group metal component are introduced simultaneously into said moulded composite support to prepare the catalyst of the present invention, and preferably further comprising a step of drying the obtained catalyst. In another embodiment, the organic additive and the VIII Group metal component and the VIB Group metal component are introduced respectively into said moulded composite support to prepare the catalyst of the present invention. As a preferred embodiment, said moulded composite support is firstly contacted with the solution containing at least one of VIII Group metal compounds and the at least one of VIB Group metal compounds, then dried, subsequently calcined or not calcined, and then contacted further with the solution containing the organic additive, and dried. Said contacting procedure may be finished by any method, for example, an impregnation method. There is no special limitation on said impregnation method. A conventional method can be used. Said conditions for drying and calcining are usual conditions for preparing the catalyst in the art without no special limitation. However, the conditions that may be mentioned are: a drying temperature of 80~350° C., preferably 100~300° C., a drying time of 1~24 hrs, preferably 2~12 hrs, a calcining temperature of 350~550° C., preferably 400~500° C. and a calcining time of 1~10 hrs, preferably 2~8 hrs.

According to the present invention, it is stipulated that, by selecting an introduced amount of said organic additive, the finally obtained catalyst is made to have 0.1~40 wt % of the organic additive, preferably 0.5~30 wt %, based on the weight of the catalyst.

In the preparation of the catalyst of the present invention, there is no special limitation on VIII Group metal compound and the VIB Group metal compound used therein, so long as they are able to provide metal components needed for the present invention. That is to say, a well-known type of these metal compounds in the art can be used. More particularly, said VIII Group metal compound may be one or more compounds selected from soluble compounds of these metals, for example, one or more compounds selected from nitrate, acetate, carbonate, chloride and soluble complex compound of these metals. Said VIB Group metal compound may be one or more compounds selected from soluble compounds of these metals, for example, one or more compounds selected from molybdate, paramolybdate, tungstate, metatungstate and ethyl metatungstate of these metals.

In addition, the solvent used for formulating various solutions in the preparation procedure of the catalyst of the present invention is one selected conventionally by one skilled in the art without any special limitation. Therefore no specific stipulation is made herein.

The apparatus used for the preparation procedure of the catalyst according to the present invention are also well known in the art, so there is no need to say more herein.

Furthermore, besides several additive components mentioned above, the catalyst of the present invention may also contain additional components, such as F, P or B and the like that are well known in the art, depending upon requirement.

It should be further pointed out that the content of metal component in the catalyst of the present invention can be measured by a conventional method in the art, such as, X-ray fluorescence spectrometry and the like. Other parameters, such as the content of support and organic compounds, may be calculated according to practical feeding amount.

After being prepared, the catalyst according to the present invention can be processed into various moulded products that are easy to operate, depending upon different objectives or requirements, such as, microsphere, spheroid, tablet or bars and the like. The moulding may be carried out by conventional method, such as pelleting, tableting, extruding and the like.

According to conventional method in the art, the catalyst according to the present invention are generally presulfurized before being used in the presence of hydrogen at a temperature of 140~370° C. with sulfur, hydrogen sulfide or sulfur-containing feedstock. This kind of presulfurization may be carried out at exo-reactor, or in situ of the reactor, and therefrom the catalyst is converted into sulfide type.

In another embodiment, the present invention relates to the use of said hydrocracking catalyst for the hydrocracking of hydrocarbon oil. That is to say, the present invention provides a hydrocracking process of hydrocarbon oil, which comprises contacting a hydrocarbon oil feedstock with said hydrocracking catalyst of the present invention in the presence of hydrogen under the conditions of hydrocracking reaction.

In the process according to the present invention for hydrocracking hydrocarbon oil, there is no special limitation on conditions of said hydrocracking reaction, and general reaction conditions may be used. For example, reaction conditions that may be mentioned are a reaction temperature of 200~650° C., preferably 300~510° C., a reaction pressure of 3~24 MPa, preferably 4~15 MPa, a liquid hourly space velocity of 0.1~10 hrs$^{-1}$, preferably 0.2~5 hrs$^{-1}$ and a hydrogen/oil volume ratio of 100~5000, preferably 200~1000.

The hydrocracking process according to the present invention can be used directly to process various kinds of hydrocarbon oil feedstocks by hydrocracking. Said hydrocracking process may be based on any hydrocracking or hydrotreating process well-known in the art, and the products usually obtained from the process generally contain products having boiling point and/or molecular weight lower than the hydrocarbon feedstock. Said hydrocarbon oil feedstock may be selected from heavy mineral oil, synthetic oil or their mixed distillates. In a preferred embodiment, said heavy mineral oil is selected from straight-run gas oil, vacuum gas oil, demetallized oil, atmospheric residue, deasphalted vacuum residue, coking distillate, catalytic cracking distillate, shale oil, coal liquefied oil or tar sand oil and the like, and said synthetic oil is Fischer-Tropsch oil.

The catalyst according to the present invention is especially suitable for the hydrocracking of heavy and poor distillates to produce fraction oils having a distillation range of <350° C. and higher than 350° C., especially suitable for the hydrocracking process for producing more distillate having the distillation range less than 350° C., and/or for the hydrocracking process to decrease much efficiently the aromatic and naphthene contents of fractions for feeding, particularly for the distillate hydrocracking well-known in the art to increase diesel-fuel cetane number and decrease BMCI value of tail oil, and the like.

Said BMCI value in the present invention refers to the index of US Mine Bureau, which is well known to one skilled in the art, for example, a specific calculation equation being given in the reference document (*Petroleum Refining Engineering*, page 74, 3rd Edition, Editor-in-chief: Lin Shixiong, Petroleum Industry Publisher, ISBN7-5021-2886-7). Under comparable conditions, the value has a regular corresponding relationship with the content of aromatics and naphthene in the sample. Generally, the higher the value is, the more aromatics and naphthene the sample has.

The following Examples are intended to describe the present invention, but these Examples are not used to limit the present invention.

Content of each metal component in the Examples are measured by X-ray fluorescence spectrometry.

All reagents used in Examples are chemical pure reagents. Otherwise, a special explanation is given.

EXAMPLES

Example 1

The present Example is intended to describe the preparation of the zeolite molecular sieve having a lower ratio of B-acid/L-acid 200 g of NaY zeolite molecular sieve in dry basis (manufactured by Changling Catalyst Plant, with a crystal unit constant of 24.68, a relative crystallinity of 100, a specific surface area of 720 m$^2$/g and a sodium oxide content of 13.1 wt %) was added with 200 g ammonium sulfate (a product from Beijing Yili Fine Chemicals Corporation, Ltd.) and 2000 ml water. The resultant was stirred and heated to 90° C., kept at the constant temperature for 2 hr, and filtered and washed with water for three times to obtain NY-1 zeolite molecular sieve.

100 g NY-1 was put in a tube furnace, then heated with passing steam to 600° C., and kept at the constant temperature for 2 hr. It was further cooled and withdrawn, and then added with 1000 ml aqueous solution containing 0.5% sulfur acid, and stirred and heated to 90° C., then kept at the constant temperature for 2 hr, and washed with water for three times. The filter cake of NY-2 zeolite molecular sieve was obtained.

The aforementioned hydrothermal treating and acid-washing procedures were repeated three times to obtain CZ-1 zeolite molecular sieve. CZ-1 was sampled for the analysis of infrared spectrum of hydroxy group and B-acid and L-acid. Results are shown in Table 1.

Example 2

The present Example is intended to describe the preparation of a zeolite molecular sieve having a high ratio of B-acid and L-acid.

100 g NY-1 was dried at 120° C., then put in a muffle furnace, and heated to 600° C., kept at the constant temperature for 2 hr. It was further cooled and withdrawn, and then added into 1000 ml aqueous solution containing 0.1% sulfur acid and 100 g ammonium sulfate (a product from Beijing Yili Fine Chemicals Corporation, Ltd.), stirred and heated to 90° C., then kept the constant temperature for 2 hr, and filtered to obtain a filter cake. The aforementioned exchanging procedure was repeated for three times on the filter cake, then dried at 120° C. to obtain CZ-2 zeolite molecular sieve. CZ-2 was sampled to carry out the analysis of infrared spectrum of hydroxy group (its infrared spectrum of hydroxy group is shown in the attached FIG. 1) and B-acid and L-acid, and the results are shown in Table 1.

Example 3

The present Example is intended to describe the preparation of a zeolite molecular sieve having a high ratio of B-acid to L-acid and having two kinds of silicon-hydroxy groups.

100 g NY-1 was put into a muffle furnace, heated with passing steam to 550° C., then kept at the constant temperature for 2 hrs. It was further cooled and withdrawn, and added into 1000 ml aqueous solution containing 0.1% of sulfur acid and 100 g ammonium sulfate (a product from Beijing Yili Fine Chemicals Corporation, Ltd.), stirred and heated to 90° C., then kept in the constant temperature for 2 hrs, and then filtered to obtain a filter cake. The aforementioned exchanging procedure was repeated twice on the filter cake. The obtained filter cake was added with 500 ml aqueous solution containing 2 g ammonium fluosilicate and 100 g ammonium sulfate (a product from Beijing Yili Fine Chemicals Corporation, Ltd.), and stirred, heated to 90° C., and kept at the constant temperature for 2 hrs, then filtered and dried to obtain CZ-3 zeolite molecular sieve. the CZ-3 was sampled to carry out the analysis of infrared spectrum of hydroxy group (its infrared spectrum of hydroxy group is shown in FIG. 2 attached), B-acid and L-acid, and the results are shown in Table 1.

TABLE 1

| Example | Zeolite Molecular Sieve No. | Peak Position, cm$^{-1}$, of Hydroxy Group Appearing in the range of 3760~3685 cm$^{-1}$ | | Ratio of B-acid/L-acid |
|---|---|---|---|---|
| 1 | CZ-1 | 3740 | — | 0.8 |
| 2 | CZ-2 | 3744 | — | 1.6 |
| 3 | CZ-3 | 3738 | 3713 | 8.3 |

Comparative Example 1

The Comparative Example is intended to describe the reference catalyst and a preparation method of the same.

150 g (on dry basis, the same hereinafter) CZ-1 zeolite was mixed with 850 g (on dry basis) pseudo-boehmite (manufactured by Shandong Aluminum Plant, with a trade name of SD powder) and 30 g sesbania powder, then extruded into trefoil bars having a circumcircle diameter of 1.6 mm, oven-dried at 120° C. and calcined at 550° C. for 3 hrs, and then RS-1 support was obtained. The catalyst support has a composition shown in Table 2. 100 g RS-1 support after cooled to room temperature was taken and impregnated with 80 ml aqueous solution containing 32.67 g ammonium metatungstate (from Sichuan Zigong Hard Alloy Factory, with a tungsten oxide content of 82 wt %) and 22.97 g nickel nitrate (a product from Beijing Yili Fine Chemicals Corporation, Ltd., with a nickel oxide content of 25.4 wt %), then oven-dried at 120° C. and calcined at 480° C. for 4 hrs. R-1 catalyst was obtained with a composition shown in Table 3.

Example 4

The present Example is intended to describe the catalyst according to the present invention and the preparation method of the same.

100 g RS-1 support was impregnated with 80 ml aqueous solution containing 32.67 g ammonium metatungstate (Sichuan Zigong Hard Alloy Factory, with a tungsten oxide content of 82 wt %), 22.97 g nickel nitrate (a product from Beijing Yili Fine Chemicals Corporation, Ltd., with a nickel oxide content of 25.4 wt %) and 1.77 g EDTA (a product from Beijing Chemical Plant), then treated at 180° C. for 4 hrs, to obtain C-1 catalyst with a composition shown in Table 3.

Example 5

The present Example is intended to describe the catalyst according to the present invention and the preparation method of the same.

The catalyst support is prepared as that in Comparative Example 1, except that CZ-1 zeolite was replaced with CZ-2 zeolite. The support obtained was named as CS-1. 100 g CS-1 support was impregnated with 80 ml aqueous solution containing 32.67 g ammonium metatungstate (from Sichuan Zigong Hard Alloy Factory, with a tungsten oxide content of 82 wt %), 22.97 g nickel nitrate (a product from Beijing Yili Fine Chemicals Corporation, Ltd. with a nickel oxide content of 25.4 wt %) and 1.77 g EDTA (a product from Beijing Chemical Plant), then treated at 180° C. for 4 hrs, to obtain C-2 catalyst with a composition shown in Table 3.

Example 6

The present Example is intended to describe the catalyst according to the present invention and the preparation method of the same.

The catalyst support is prepared as that in Comparative Example 1, except that CZ-1 zeolite was replaced with CZ-3 zeolite. The support obtained was named as CS-2. 100 g CS-2 support was impregnated with 80 ml aqueous solution containing 32.67 g ammonium metatungstate (from Sichuan Zigong Hard Alloy Factory, with a tungsten oxide content of 82 wt %) and 22.97 g nickel nitrate (a product from Beijing Yili Fine Chemicals Corporation, Ltd., with a nickel oxide content of 25.4 wt %). The resultant was oven-dried at 120° C. and calcined at 320° C. for 2 hrs, impregnated with 60 ml aqueous solution containing 48.43 g glycol (a product from Beijing Yili Fine Chemicals Corporation, Ltd.) again and treated at 120° C. for 10 hrs, to obtain C-3 catalyst with a composition shown in Table 3.

Comparative Example 2

The present Comparative Example is intended to illuminate the preparation of a reference catalyst.

Reference Catalyst RC-2 was prepared completely according to Example 6, except that the catalyst did not experience the treatment process using glycol after being supported with NiW.

Example 7

The present Example is intended to describe the catalyst according to the present invention and the preparation method of the same.

450 g aluminum hydroxide powder (manufactured by Changling Catalyst Plant, with a trade name of CL dry glue powder) in dry basis, 350 g pseudo-boehmite (manufactured by Shandong Aluminum Plant, with a trade name of SD powder) in dry basis, 100 g ZSM-5 zeolite molecular sieve (manufactured by Changlin Jianchang Catalyst Plant, with a silica-alumina ratio of 50 and a B-acid/L-acid ratio of 4.3) in dry basis and 100 g Beta zeolite molecular sieve (manufactured by Changlin Jianchang Catalyst Plant, with a silica-alumina ratio of 27 and a B-acid/L-acid ratio of 3.2) in dry basis were mixed and extruded into butterfly-type of bars having a circumcircle diameter of 3.6 mm. The resultant was oven-dried at 120° C., and calcined at 550° C. for 3 hrs, to obtain CS-3 support with a composition of the catalyst support shown in Table 2. 100 g CS-4 support after cooled to room temperature was impregnated with 80 ml aqueous solution containing 9.25 g ammonium paramolybdate (from Zuzhou Hard Alloy Factory, with a molybdenum oxide content of 80 wt %), 43.84 g ammonium metatungstate (from Sichuan Zigong Hard Alloy Factory, with a tungsten oxide content of 82 wt %) and 18.05 g nickel nitrate (a product from Beijing Yili Fine Chemicals Corporation, Ltd., with a nickel oxide content of 24.4 wt %), and dried at 120° C., and calcined at 450° C. for 3 hr, then cooled to room temperature, and was impregnated further with 50 ml aqueous solution containing 26.41 g citric acid again, and dried at 120° C. for 4 hr to obtain C-4 catalyst with a composition shown in Table 3.

Example 8

The present Example is intended to describe the catalyst according to the present invention and the preparation method of the same.

400 g pseudo-boehmite (manufactured by Shandong Aluminum Plant, with a trade name of SD powder) in dry basis and 600 g REHY zeolite molecular sieve (manufactured by Changling Catalyst Plant, with a trade name of REHY, a crystal unit constant of 24.55 and a B-acid/L-acid ratio of 1.8) in dry basis were mixed and extruded into butterfly-type of bars having a circumcircle diameter of 3.6 mm, oven-dried at 120° C., and calcined at 500° C. for 3 hrs to obtain CS-4 support having a composition shown in Table 2. After being cooled to room temperature, 100 g CS-4 support was impregnated with 80 ml aqueous solution containing 56.31 g ethylene diamine, and treated at 105° C. for 2 hrs, then impregnated with 60 ml aqueous solution containing 22.64 g ammonium metatungstate (from Sichuan Zigong Hard Alloy Factory, with a tungsten oxide content of 82 wt %) and 36.58 g nickel nitrate (a product from Beijing Yili Fine Chemicals Corporation, Ltd., with a nickel oxide content of 25.4 wt %) again, and treated at 110° C. for 8 hrs to obtain C-5 catalyst with a composition shown in Table 3.

TABLE 2

| | | Alumina, wt % | | Zeolite Molecular Sieve, wt % | |
|---|---|---|---|---|---|
| Example, | support No. | SD Powder | CL Powder, | Zeolite Molecular Sieve 1 | Zeolite Molecular Sieve 2 |
| Comparative Example 1 | RS-1 | 85 | | 15 | |
| 4 | RS-1 | 85 | | 15 | |
| 5 | CS-1 | 85 | | 15 | |
| 6 | CS-2 | 85 | | 15 | |
| 7 | CS-3 | 35 | 45 | 10 | 10 |
| 8 | CS-4 | 40 | | 60 | |

TABLE 3

| Catalyst Example No. | VIII Group Metal Component, wt % NiO | VIB Group Metal Component, wt % | | Organic Additive wt % |
|---|---|---|---|---|
| | | WO₃ | MoO₃ | |
| Comparative Example 1 RC-1 | 4.4 | 20.2 | | |
| 4 C-1 | 4.4 | 20.2 | | 0.85 |
| 5 C-2 | 4.4 | 20.2 | | 0.85 |
| 6 C-3 | 4.4 | 20.2 | | 26.8 |

TABLE 3-continued

| | Catalyst | VIII Group Metal Component, wt % | VIB Group Metal Component, wt % | | Organic Additive |
|---|---|---|---|---|---|
| Example | No. | NiO | $WO_3$ | $MoO_3$ | wt % |
| Comparative Example 2 | RC-2 | 4.4 | 20.2 | | |
| 7 | C-4 | 3.1 | 24.3 | 5 | 16.1 |
| 8 | C-5 | 7.2 | 15.3 | | 29.5 |

Examples 9~13

The present Examples are intended to describe the performance of the catalysts according to the present invention.

Hydrocracking activity of each catalyst from C1 to C5 was evaluated in a small fixed-bed hydrocracking apparatus with 0.2 ml loading of catalyst having 0.3~0.45 mm of particulate diameter under reaction conditions; a reaction temperature of 390° C., a reaction pressure of 4.0 MPa, a hydrogen-to-oil ratio (molar ratio) of 25 and a liquid hourly space velocity of 30 hrs$^{-1}$. The microreactor-evaluation was carried out with n-octane solution containing 5.61% of tetrahydronaphthalene. The catalyst was sulfurized before feedstock oil was fed for the reaction, The sulfurization conditions comprise: raising the temperature to 60° C. under is 2.0 Mpa of hydrogen pressure, then feeding n-hexane solution containing 6% $CS_2$, then raising the temperature to 300° C., and then keeping the temperature constant for 4 hr.

The aromatic-hydrogenation conversion activity of the catalyst is defined as the equation as below:

Aromatic-hydrogenation conversion activity %=100−[(Total amount of tetrahydronaphthalene in product+Total amount of naphthalene in product)/Total amount of tetrahydronaphthalene in feedstock]×100.

The evaluation results were shown in Table 4.

Comparative Example 2

The present Comparative Example is intended to illustrate the performance of the reference catalyst.

Evaluation of RC-1 was carried out using the same method as that in Example 9. Results were shown in Table 4

TABLE 4

| Example | Catalyst | Aromatic-Hydrogenation Conversion Activity, % |
|---|---|---|
| Comparative Example 2 | RC-1 | 15.3 |
| 9 | C-1 | 20.3 |
| 10 | C-2 | 26.3 |
| 11 | C-3 | 34.3 |
| 12 | C-4 | 62.4 |
| 13 | C-5 | 56.7 |

It can be known from Table 4 that the aromatic conversion activity was increased by 5.0% using C-1 catalyst containing an organic additive, as compared with RC-1 catalyst having no additive. C-2 Catalyst was prepared by using a zeolite having a high ratio of B-acid/L-acid and an organic additive, and the activity of the catalyst was increased by 11.0%, while C-3 catalyst was prepared by using a zeolite having simultaneously two silicon-hydroxy group peaks, having the activity increased further by 19.0%.

Examples 14~15

The present Examples are intended to describe the hydrocracking process according to the present invention.

The hydrocracking reaction was carried out in a 30 ml fixed bed apparatus by using a feedstock oil as shown in Table 5 and C-3 catalyst with a loading of the catalyst of 20 ml under reaction conditions: a reaction temperature of 360° C. or 380° C., a hydrogen partial pressure of 6.4 MPa, a liquid hourly space velocity of 0.75 hrs$^{-1}$ and a hydrogen/oil volume ratio of 800. The results were shown in Table 6.

Comparative Example 3

The present Example is intended to describe and compare the hydrocracking process according to the present invention.

The hydrocracking reaction was carried out in a 30 ml fixed bed apparatus by using feedstock oil shown in Table 5 with 20 ml loading of RC-2 catalyst under reaction conditions: a reaction temperature of 350° C., a hydrogen partial pressure of 6.4 MPa, a liquid hourly space velocity of 0.75 hrs$^{-1}$ and a hydrogen/oil volume ratio of 800. Results were shown in Table 6.

TABLE 5

| Density (20° C.), g/cm$^3$ | 0.9062 |
|---|---|
| S, wt % | 1.5 |
| N, mg/L | 800 |
| Simulation Distillation (ASTM D-2887) | |
| IBP | 305 |
| 50 | 393 |
| FBP | 470 |

TABLE 6

| Item | Comparative Example 3 | Example 14 | Example 15 |
|---|---|---|---|
| Catalyst | RC-2 | C-3 | C-3 |
| Reaction Temperature ° C. | 350 | 350 | 380 |
| Yield of <350° C. Formation Oil, wt % | 44.5 | 50.3 | 69.3 |
| BMCI Value of >350° C. Tail Oil | 16.2 | 14.3 | 9.5 |

It can be seen from results given in Table 6 that, as compared with the comparative hydrocracking process using RC-2 catalyst containing no organic additive under completely the same condition, the hydrocracking process using the C-3 catalyst containing an organic additive has a yield of <350° C. formation oil increased by 5.8 wt % and a BMCI value of >350° C. formation oil decreased by 1.9 unit; when the reaction temperature is increased to 380° C., the hydrocracking process using the catalyst containing an organic additive has the yield of <350° C. formation oil further increased by 16 wt % and the BMCI value of >350° C. formation oil decreased further by 4.8 unit.

The invention claimed is:

1. A hydrocracking catalyst, comprising a moulded composite support of a zeolite molecular sieve with alumina, at least one of Group VIII metal components, at least one of Group VIB metal components and an organic additive, wherein said organic additive is one or more compounds selected from the group consisting of oxygen-containing and nitrogen-containing organic compounds, and the content of said zeolite molecular sieve is 3 to 60 wt %, the content of said alumina is 10 to 80 wt % and the content of said organic additive is 0.1 to 40 wt %, based on the weight of said catalyst; and the content of said Group VIII metal component is 1 to 15 wt % and the content of said Group VIB metal component is 5 to 40 wt %, as calculated on oxide and based on the weight of said catalyst, and wherein said zeolite molecular sieve has a B-acid/L-acid ratio of more than 0.9, and has at least one characteristic peak corresponding to a silicon-hydroxy group appearing in the range of 3760~3685 cm$^{-1}$ as measured by infrared spectroscopy.

2. The hydrocracking catalyst according to claim 1, wherein said catalyst consists of said moulded composite support of said zeolite molecular sieve with said alumina, said at least one of Group VIII metal components, said at least one of Group VIB metal components and said organic additive, wherein said organic additive is one or more compounds selected from the group consisting of oxygen-containing and nitrogen-containing organic compounds, and the content of said zeolite molecular sieve is 3 to 60 wt %, the content of said alumina is 10 to 80 wt % and the content of said organic additive is 0.1 to 40 wt %, based on the weight of said catalyst; and the content of said Group VIII metal component is 1 to 15 wt % and the content of said Group VIB metal component is 5 to 40 wt %, as calculated on oxide and based on the weight of said catalyst, and wherein said zeolite molecular sieve has a B-acid/L-acid ratio of more than 0.9, and has at least one characteristic peak corresponding to a silicon-hydroxy group appearing in the range of 3760~3685 cm$^{-1}$ as measured by infrared spectroscopy.

3. The hydrocracking catalyst according to claim 1 or 2, wherein said oxygen-containing organic compound is one or more compounds selected from the group consisting of organic alcohols and organic acids, said nitrogen-containing organic compound is one or more compounds selected from the group consisting of organic amines, and the content of said zeolite molecular sieve is 5 to 60 wt %, the content of said alumina is 15 to 80 wt % and the content of said organic additive is 0.5 to 30 wt %, based on the weight of said catalyst; the content of said Group VIII metal component is 2 to 8 wt % and the content of said Group VIB metal component is 10 to 35 wt % as calculated on oxide and based on the weight of said catalyst.

4. The hydrocracking catalyst according to claim 1 or 2, wherein said zeolite molecular sieve is one or more zeolite molecular sieves selected from the group consisting of a zeolite molecular sieve having faujasite structure, a zeolite molecular sieve having Beta zeolite structure and a zeolite molecular sieve having mordenite structure.

5. The hydrocracking catalyst according to claim 4, wherein said zeolite molecular sieve having faujasite structure is one or more zeolite molecular sieves selected from the group consisting of a HY zeolite molecular sieve, a rare earth Y-zeolite REY molecular sieve, a rare earth HY zeolite REHY molecular sieve, a super-stable Y-zeolite USY molecular sieve, a rare earth super-stable Y-zeolite REUSY molecular sieve, and a dealuminized Y-zeolite molecular sieve.

6. The hydrocracking catalyst according to claim 1 or 2, wherein the B-acid/L-acid ratio of said zeolite molecular sieve is 1 to 10, and said zeolite molecular sieve has two characteristic peaks corresponding to a silicon-hydroxy group appearing in the range of 3760~3685 cm$^{-1}$ as measured by infrared spectroscopy.

7. A preparation process of said hydrocracking catalyst according to claim 1, wherein said process comprises mixing a zeolite molecular sieve with alumina and/or a precursor of alumina, moulding and calcining the obtained mixture to prepare a moulded composite support, then introducing at least one of Group VIII metal components, at least one of Group VIB metal components and an organic additive into said moulded composite support, wherein said organic additive is one or more compounds selected from the group consisting of oxygen-containing or nitrogen-containing organic compounds, and the amounts of said various components are selected such that the content of each component in the obtained catalyst meeting the following conditions: the content of said zeolite molecular sieve is 3 to 60 wt %, the content of said alumina is 10 to 80 wt % and the content of said organic additive is 0.1 to 40 wt %, based on the weight of said catalyst; and the content of said Group VIII metal component is 1 to 15 wt % and the content of said Group VIB metal component is 5 to 40 wt %, as calculated on oxide and based on the weight of said catalyst, and wherein said zeolite molecular sieve has a B-acid/L-acid ratio of more than 0.9, and has at least one characteristic peak corresponding to a silicon-hydroxy group appearing in the range of 3760~3685 cm$^{-1}$ as measured by infrared spectroscopy.

8. The preparation process of said hydrocracking catalyst according to claim 7, wherein said oxygen-containing organic compound is one or more compounds selected from the group consisting of organic alcohols and organic acids, said nitrogen-containing organic compound is one or more compounds selected from the group consisting of organic amines, and the amounts of said various components are selected such that the content of each component in the obtained catalyst meeting following conditions: the content of said zeolite molecular sieve is 5 to 60 wt %, the content of said alumina is 15 to 80 wt % and the content of said organic additive is 0.5 to 30 wt %, based on the weight of said catalyst; the content of said Group VIII metal component is 2 to 8 wt % and the content of said Group VIB metal component is 10 to 35 wt % as calculated on oxide and based on the weight of said catalyst.

9. The preparation process of said hydrocracking catalyst according to claim 7, wherein said zeolite molecular sieve is one or more zeolite molecular sieves selected from the group consisting of a zeolite molecular sieve having faujasite structure, a zeolite molecular sieve having Beta zeolite structure and a zeolite molecular sieve having mordenite structure.

10. The preparation process of said hydrocracking catalyst according to claim 9, wherein said zeolite molecular sieve having faujasite structure is one or more compounds selected from the group consisting of a HY zeolite molecular sieve, a rare earth type of Y-zeolite REY molecular sieve, a rare earth type of HY zeolite REHY molecular sieve, a super-stable Y-zeolite USY molecular sieve, a rare earth type of super-stable Y-zeolite REUSY molecular sieve and a dealuminized Y-zeolite molecular sieve.

11. The preparation process of said hydrocracking catalyst according to claim 7, wherein the B-acid/L-acid ratio of said zeolite molecular sieve is 1.0 to 10.0, and, when characterized by infrared spectrogram of hydroxyl group, said zeolite molecular sieve has two characteristic peaks corresponding to a silicon-hydroxy group appearing in the range of 3760~3685 cm$^{-1}$ as measured by infrared spectroscopy.

12. A hydrocracking process of hydrocarbon oil, said process comprises contacting a hydrocarbon oil feedstock with the hydrocracking catalyst according to claim 1, in the presence of hydrogen under the conditions for hydrocracking reaction.

13. The hydrocracking process of hydrocarbon oil according to claim 12, wherein said conditions for hydrocracking reaction comprise: a reaction temperature of 200 to 650° C., a hydrogen partial pressure of 3 to 24 MPa, a liquid hourly space velocity of 0.1 to 10 hrs$^{-1}$ and a hydrogen/oil volume ratio of 100 to 5000.

14. The hydrocracking process of hydrocarbon oil according to claim 13, wherein said conditions for hydrocracking reaction comprise: a reaction temperature of 220 to 510° C., a hydrogen partial pressure of 4 to 15 MPa, a liquid hourly space velocity of 0.2 to 5 hrs$^{-1}$ and a hydrogen/oil volume ratio of 200 to 1000.

15. The hydrocracking process of hydrocarbon oil according to claim 12, wherein said hydrocarbon oil is one selected from heavy mineral oil, synthetic oil or their mixed distillates.

16. The hydrocracking process of hydrocarbon oil according to claim 15, wherein said heavy mineral oil is selected from straight-run gas oil, vacuum gas oil, demetallized oil, atmospheric residue, deasphalted vacuum residue, coking distillate, catalytic cracking distillate, shale oil, coal liquefied oil or tar sand oil, and said synthetic oil is Fischer-Tropsch oil.

* * * * *